(12) United States Patent
Genoud et al.

(10) Patent No.: US 8,957,674 B2
(45) Date of Patent: Feb. 17, 2015

(54) PUMP WITH ROTOR POSITION MEASUREMENT SYSTEM

(75) Inventors: Dominique Genoud, Kaltbrunn (CH); Franck Robin, Lenzburg (CH); Helmut Thiemer, Sachseln (CN)

(73) Assignee: Sensile Pat AG, Haegendorf (CH)

( * ) Notice: Subject to any disclaimer, the term of this patent is extended or adjusted under 35 U.S.C. 154(b) by 481 days.

(21) Appl. No.: 13/383,654

(22) PCT Filed: Jul. 12, 2010

(86) PCT No.: PCT/IB2010/053170
§ 371 (c)(1),
(2), (4) Date: Jan. 12, 2012

(87) PCT Pub. No.: WO2011/007306
PCT Pub. Date: Jan. 20, 2011

(65) Prior Publication Data
US 2012/0126795 A1     May 24, 2012

(30) Foreign Application Priority Data
Jul. 13, 2009   (EP) .................................. 09165357

(51) Int. Cl.
| | | |
|---|---|---|
| G01B 7/30 | (2006.01) | |
| G01R 33/07 | (2006.01) | |
| F04B 7/06 | (2006.01) | |
| F04B 35/04 | (2006.01) | |
| F04B 49/10 | (2006.01) | |
| F04B 51/00 | (2006.01) | |
| G01F 11/02 | (2006.01) | |

(52) U.S. Cl.
CPC ............... *F04B 7/06* (2013.01); *F04B 35/04* (2013.01);*F04B 49/10* (2013.01); *F04B 51/00* (2013.01); *G01F 11/021* (2013.01); *G01F 11/029* (2013.01)
USPC ................................. 324/207.25; 324/207.2

(58) Field of Classification Search
USPC .................................................... 324/207.25
See application file for complete search history.

(56) References Cited

U.S. PATENT DOCUMENTS

| | | |
|---|---|---|
| 5,312,233 A | 5/1994 | Tanny et al. |
| 6,510,366 B1 | 1/2003 | Murray et al. |
| 2005/0092772 A1 | 5/2005 | Miller et al. |
| 2009/0123309 A1 | 5/2009 | Hilber et al. |

FOREIGN PATENT DOCUMENTS

| | | |
|---|---|---|
| EP | 1132615 | 9/2001 |
| EP | 1527793 | 5/2005 |
| EP | 1843039 | 10/2007 |
| WO | WO 02/25225 | 3/2002 |
| WO | WO 2005/039674 | 5/2005 |
| WO | WO 2007/074363 | 7/2007 |

OTHER PUBLICATIONS

Written Opinion in International Application No. PCT/IB2010/053170, May 4, 2011, pp. 1-12.

*Primary Examiner* — Bot Ledynh
(74) *Attorney, Agent, or Firm* — Saliwanchik, Lloyd & Eisenschenk

(57) ABSTRACT

A pump comprising an electrical motor drive (2) and a pump engine (3), the pump engine having a stator portion (32) and an axially and rotatably movable rotor portion (30) mounted in the stator portion. The electrical motor drive comprises a rotor (6) with a permanent magnet (20), a stator (4) with a magnetic circuit (10) and one or more coils, and a position sensor (8) comprising at least one magnetic field detector (24*a*, 24*b*) positioned in the proximity of the rotor permanent magnet and configured to detect both rotational and axial movement of the rotor.

15 Claims, 7 Drawing Sheets

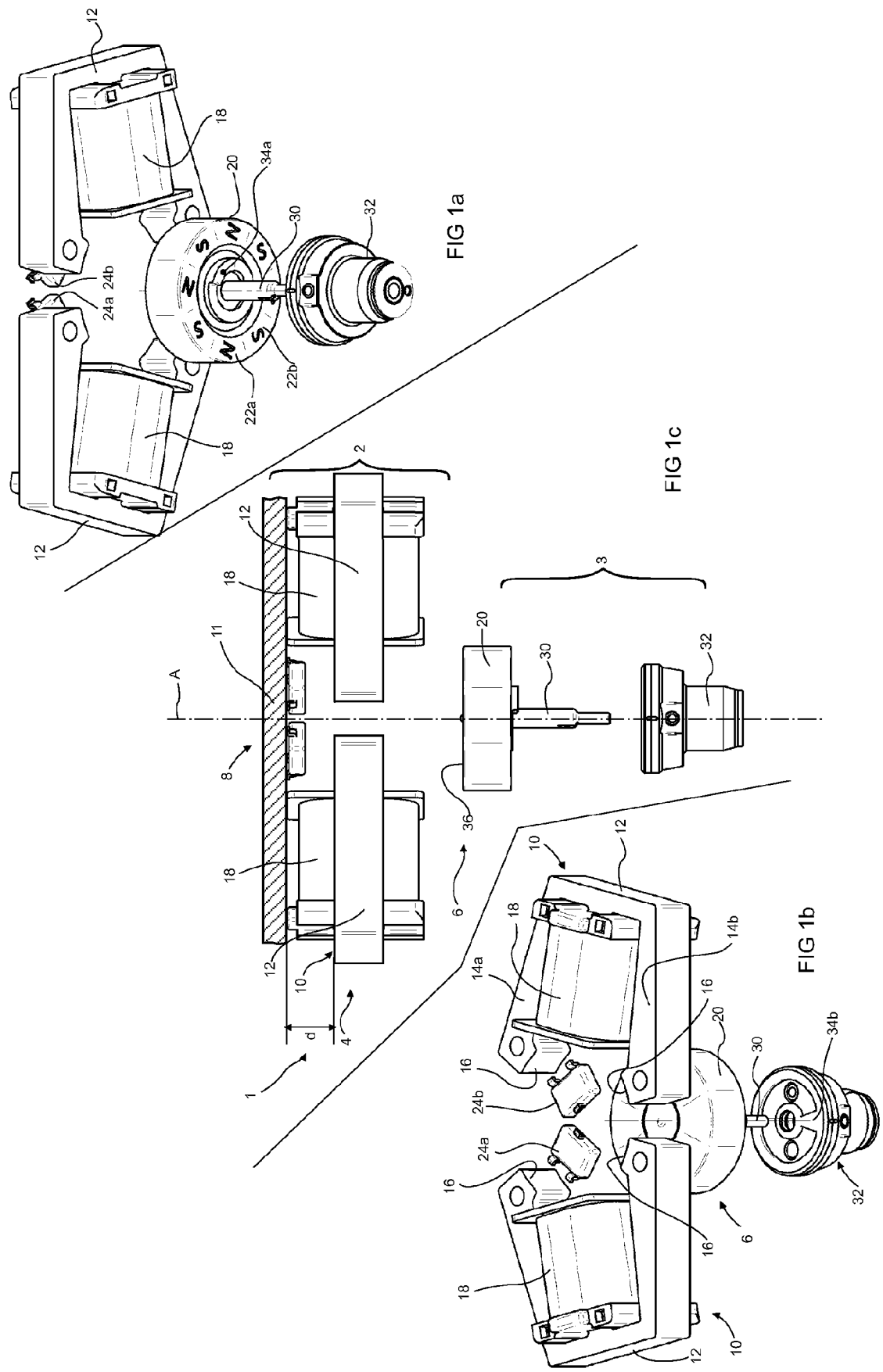

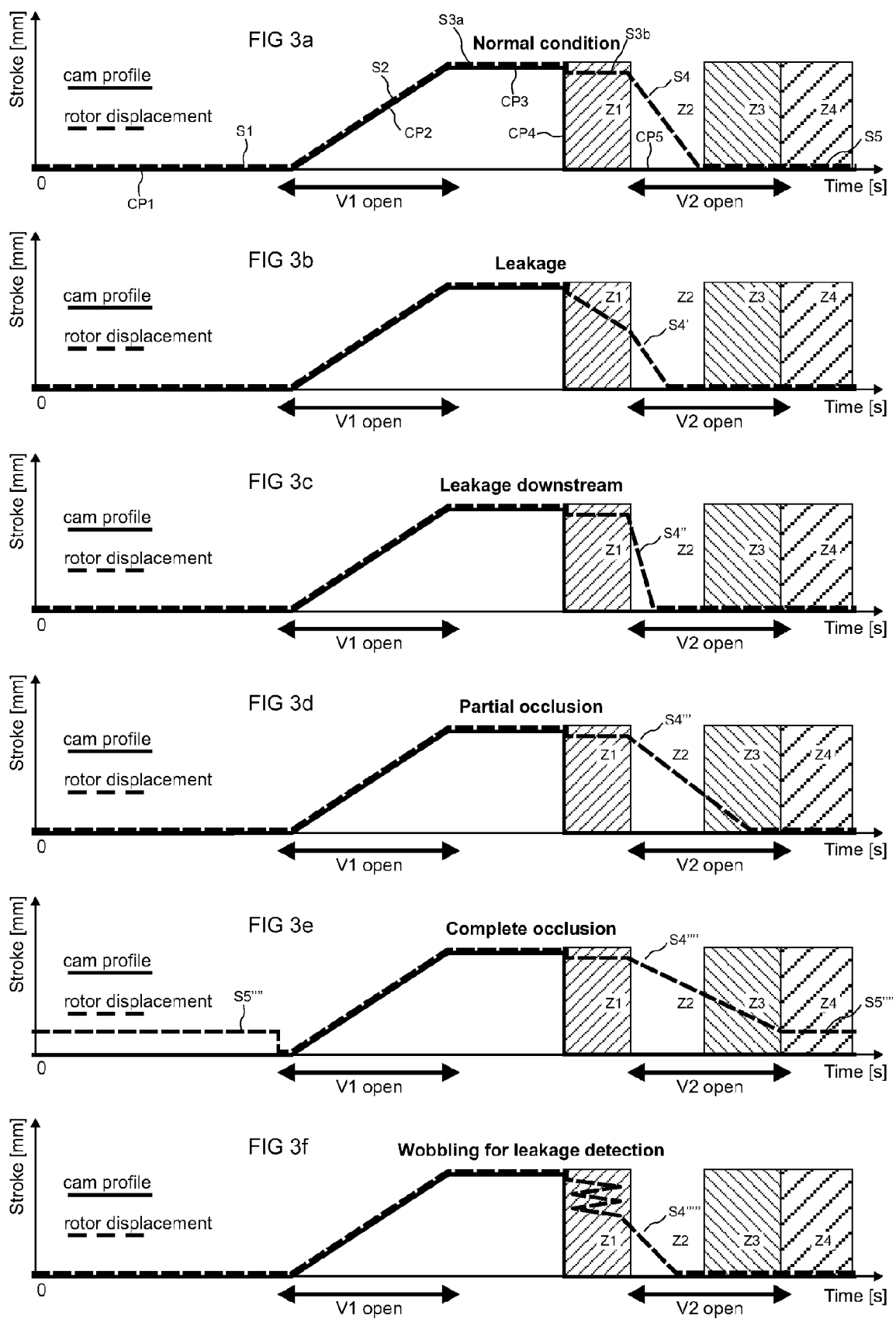

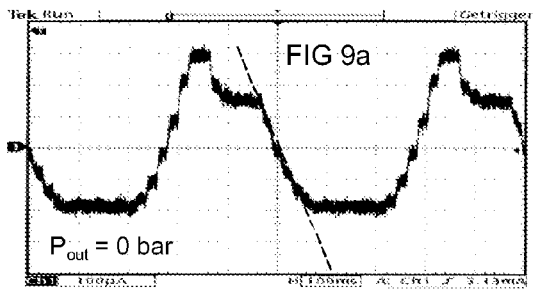
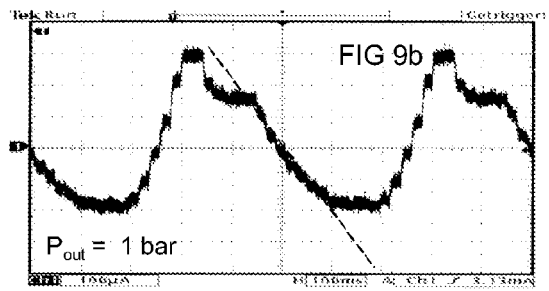
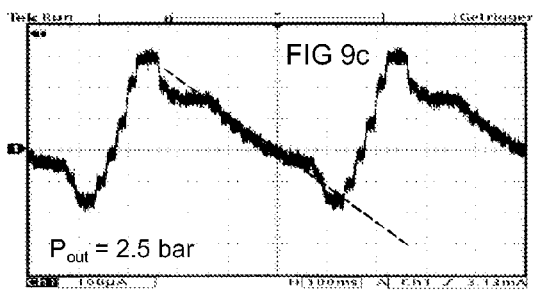
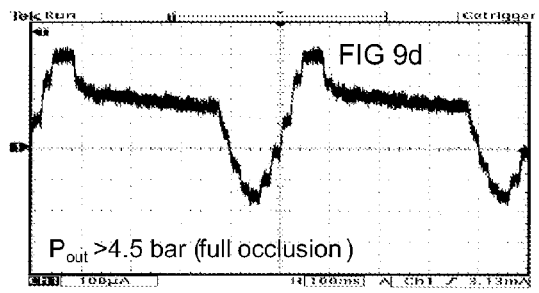
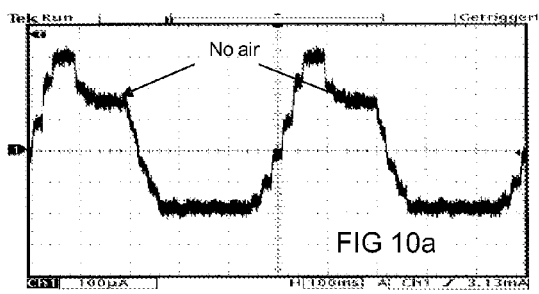
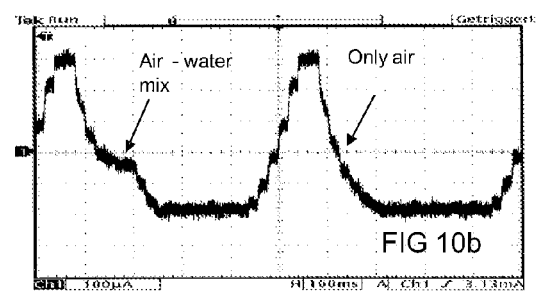
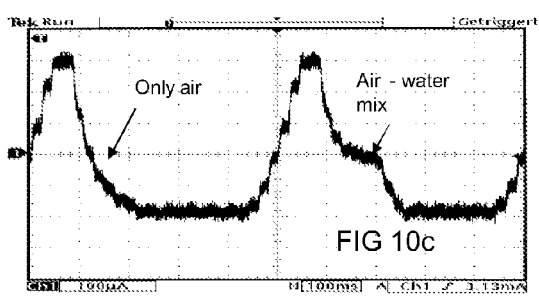
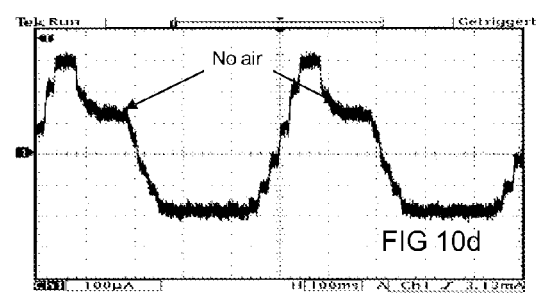

PUMP WITH ROTOR POSITION MEASUREMENT SYSTEM

CROSS-REFERENCE TO RELATED APPLICATION

This application is the U.S. national stage application of International Patent Application No. PCT/IB2010/053170, filed Jul. 12, 2010, the disclosure of which is hereby incorporated by reference in its entirety, including all figures, tables and amino acid or nucleic acid sequences.

The present invention relates to a pump with a rotatably and axially movable rotor.

A pump with a rotatably and axially movable rotor is described in WO 2005/039674 and WO 2007/074363. In the afore-mentioned publications, the rotational and axial movement of the rotor relative to the stator creates a pumping action while opening and closing valves to draw liquid into the pump and to expel liquid from the pump. A cam on the rotor cooperating with a complementary cam on the stator causes the axial displacement of the rotor when one of the valves is open. When both valves are closed, axial displacement of the rotor should be essentially nil subject to a certain elasticity of the chamber containing the liquid, the liquid being essentially incompressible. The presence of air in the pump or of occlusions hindering the flow of the liquid downstream of the pump may affect the axial displacement of the rotor and the pumping characteristics of the pump.

In many medical applications, such as the transcutaneous delivery of liquid drugs, the presence of air in the liquid to be administered is highly undesirable. In drug delivery systems there may also be occurrences of occlusion, for example due to blood clotting or crushing of catheter tubing or more generally application or build-up of a back-pressure, or of leakage. In many conventional systems, separate pressure sensors are installed in the system with a view of detecting occlusion or leakage however such systems are usually not adapted to detect reliably air bubbles. Moreover, the presence of separate sensors complicates the pump system and renders it more complex and costly to operate. The pump and pressure sensors being separate, there is also a certain risk that the sensors may function incorrectly without being noticed without discontinuing the operation of the pump.

The detection of occlusion or leakage of a pump system, or the detection of presence of air in a pump would also be useful in many applications outside the medical field.

It is an object of this invention to provide an accurate, reliable, compact and economical pump.

It is advantageous to provide a pump with reliable means for detecting occlusion or leakage in the pump or downstream or upstream of the pump.

It is advantageous to provide a pump with means for detecting the presence of a gas, in particular air bubbles, in the pump.

It is another object of this invention to provide a pump for medical applications that is economical, reliable and safe. It is an advantage to provide a pump for transcutaneous drug delivery that can deliver small quantities of liquid very accurately.

Objects of this invention have been achieved by providing the pump according to claim 1.

Disclosed herein is a pump comprising an electrical motor drive and a pump engine, the pump engine having a stator portion and an axially and rotatably movable rotor portion mounted in the stator portion and having an inlet and an outlet, the electrical motor drive comprising a rotor with a permanent magnet, a stator with a magnetic circuit and one or more coils wounded on the magnetic circuit, and a position sensor comprising at least one magnetic field detector positioned in the proximity of the rotor permanent magnet and configured to detect both rotational and axial movement of the rotor.

The position sensor may, in a preferred embodiment, comprise at least a pair of magnetic field detectors. In an embodiment, the magnetic field detectors may be Hall effect sensors. The magnetic field detectors could also be of other types such as giant magneto resistive, fluxgate, or other magnetic field sensors.

The magnetic field detectors may advantageously be mounted on a circuit board of the stator on which the magnetic circuit are also mounted. The magnetic field detectors may be positioned opposite an axial end of the permanent magnet. The rotor permanent magnet may advantageously comprise alternating polarity segments disposed around the circumference of the rotor as well as towards the region of the axial end to work together with the above mentioned magnetic sensors.

An alternative solution may include either a separate unipolar magnetized magnet or a unipolar magnetized integral section of the rotor magnet, essentially arranged in a radial position being aligned with the rotor's rotational axis and a separate magnetic sensor arranged essentially in line with the rotors rotational axis A but axially distant from the rotor to work with the magnetic field of the mentioned separate magnet or rotor magnet section.

The position sensor preferably comprises at least a pair of magnetic field detectors, such as Hall effect detectors. The pair of magnetic field detectors may advantageously be positioned at a certain radial distance from the axis of rotation A of the rotor and separated from each other by a certain angular distance α configured such that the signal phase offset is 90° between the magnetic field detectors.

The rotor permanent magnet may advantageously comprise alternating polarity (N-S) segments disposed around the circumference of the rotor. The stator magnetic circuit and rotor form a stepping motor or a brushless DC motor.

Objects of this invention have been achieved by providing a method of detecting occlusion or leakage in a pump according to claim 13.

Also disclosed herein is a method of detecting occlusion or leakage of a pump, including performing an initial measurement comprising turning the rotor in a forward pumping direction at least one revolution and storing the axial displacement as a function of rotation displacement profile in a look-up table as a cam profile, measuring the rotor axial displacement as a function of rotation displacement during subsequent pumping and comparing the measured rotor displacement with the stored cam profile.

In a preferred embodiment, before recording the cam profile, the rotor is rotated in a reverse direction until a cam shoulder abuts a complementary cam finger, thus setting a defined reference starting position.

The position sensor may advantageously comprise a pair of magnetic field detectors and the axial position of the rotor may be determined by the amplitude of the signal of the magnetic field detectors whereas the angular position of the rotor may be determined by the phase relation of the signal received from both sensors, in particular the arctangent of the signal of one magnetic field detector divided by the signal of the other magnetic field detector.

Objects of this invention have also been achieved by providing a method of detecting leakage in a pump according to claim 17.

Also disclosed herein is a method of detecting air bubbles or leakage in a pump comprising an electrical motor drive and a pump engine, the pump engine having a stator portion and an axially and rotatably movable rotor portion mounted in the stator portion and having an inlet valve and an outlet valve, the method including applying a back and forth rotational displacement of the rotor while applying an axial force on the rotor, and measuring the axial displacement of the rotor occurring while the rotor back and forth movement is performed. For leakage detection, the rotor back and forth movement is effected over an angle where both valves are closed.

Further objects and advantageous aspects of the invention will be apparent from the claims and/or the following detailed description and annexed drawings in which:

FIG. 1a is an exploded perspective view of a portion of a pump according to an embodiment of this invention;

FIG. 1b is another exploded perspective view of the embodiment of FIG. 1a;

FIG. 1c is a plan side view of the embodiment of FIG. 1a;

FIG. 2b is a top view of the embodiment of FIG. 2a;

FIG. 3a is a graph illustrating the axial displacement (stroke) of the pump rotor as a function of the angular displacement of the rotor for a normal operating condition;

FIG. 3b is a graph similar to FIG. 3a illustrating a leakage condition of the pump;

FIG. 3c is a graph similar to FIG. 3a illustrating a leakage condition downstream of the pump;

FIG. 3d is a graph similar to FIG. 3a illustrating a partial occlusion condition;

FIG. 3e is graph similar to FIG. 3a illustrating a complete occlusion condition;

FIG. 3f is a graph similar to FIG. 3a illustrating a leakage condition of the pump detected by performing a wobbling movement of the rotor;

Figure 2A:
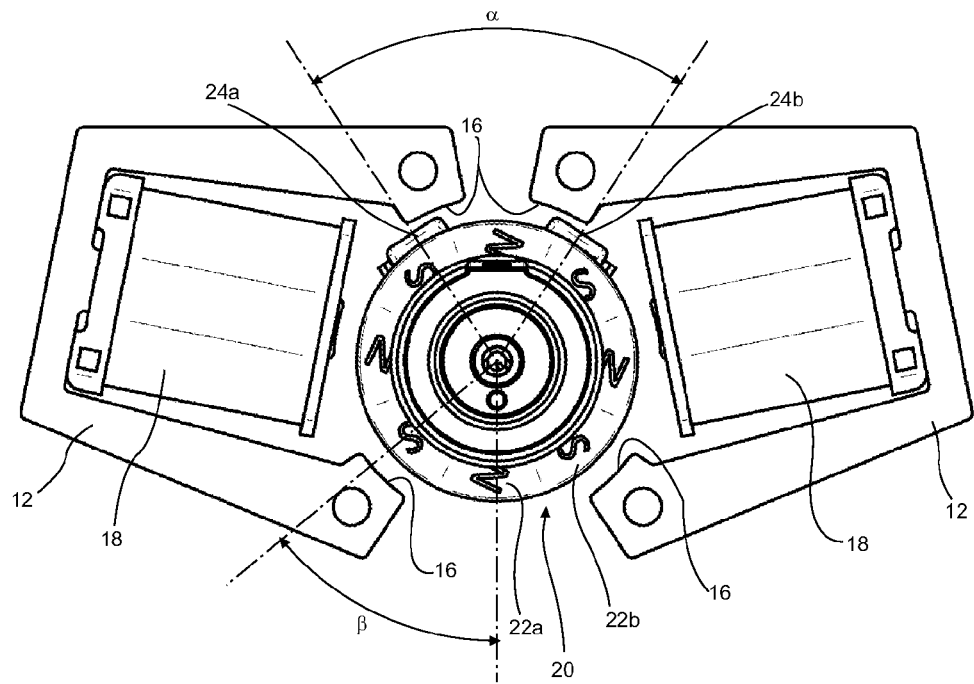
FIG. 2a is a bottom view of a portion of a pump according to an embodiment of this invention.
Figure 2B:
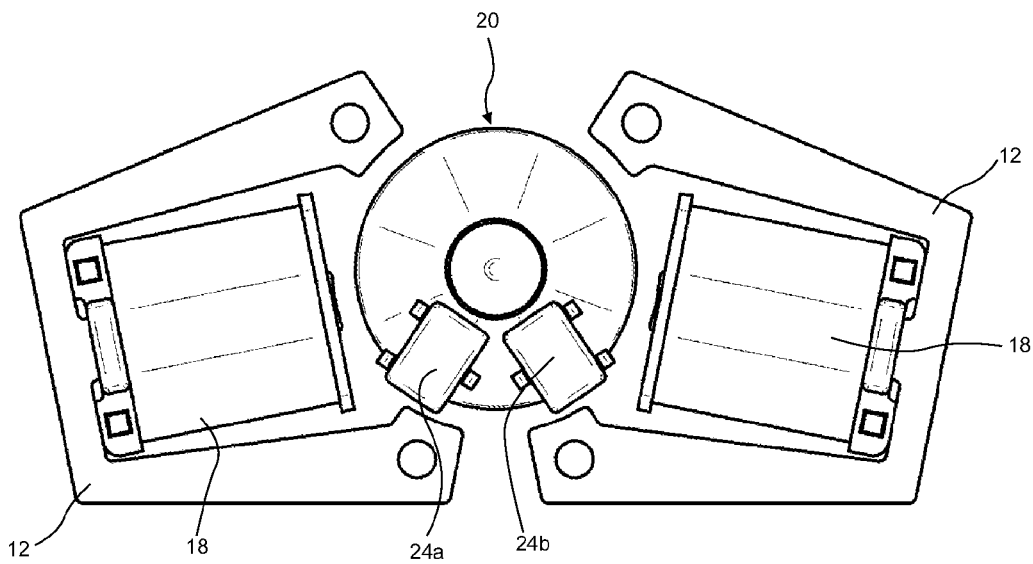

FIGS. 9a to 9d are graphs illustrating the axial displacement (stroke) of the pump rotor as a function of the angular displacement of the rotor for an experimental setup, for different pressures at the outlet of the pump, where FIG. 9a shows leakage condition (0 bar differential outlet pressure) and FIGS. 9b to 9d show differential outlet pressures of 1, 2.5, and 4.5 bars respectively, representing partial to complete occlusion;

FIGS. 10a to 10d are graphs illustrating the axial displacement (stroke) of the pump rotor as a function of the angular displacement of the rotor for an experimental setup, with air bubbles traversing the pump, where. FIG. 10 represents no air bubbles, FIG. 10b an air-water mix, FIG. 10c initially only air then air-water mix, and FIG. 10d back to no air;

Referring to the FIGS. 1a to 2b, an embodiment of a pump 1 according to this invention is illustrated, the pump comprising an electrical motor drive 2 and a pump engine 3. The pump engine 3 comprises a rotor portion 30 and a stator portion 32. The rotor portion 30 is rotatably and axially movable with respect to the stator portion, the rotor portion and stator portion having inter-engaging cam portions 34a, 34b that at least partially define the relative axial displacement of the rotor with respect to the stator as a function of the relative angular displacement. The profile of the cam on the rotor portion 30 may for example have the profile CP1-CP2-CP3-CP4-CP5 as illustrated in FIG. 3a. It may be noted that the cam profile may also be provided on the stator, rather than on the rotor, the complementary cam element corresponding to a simple protrusion on the other portion.

The pump engine may advantageously have a configuration corresponding to the configuration of the pump described in prior patent applications WO 2005/039674 and WO 2007/074363. The present invention may however also be implemented with other pump engines having both a rotational and axial relative displacement between the stator and rotor.

The electrical motor drive 2 comprises a stator 4, a rotor 6, and a position sensor 8. In the embodiment illustrated, the rotor 6 comprises a ring or disc shaped permanent magnet 20 with segments 22a, 22b of alternating polarity N-S. The rotor permanent magnet 20 is attached to the rotor portion 30 of the pump engine 3, or is integrally formed with or within the pump engine 3 rotor portion 30. The permanent magnet may for example be partially or completely overmolded by a plastics material from which the pump rotor portion is formed, or the permanent magnet could be glued, welded or otherwise bonded or mechanically attached to the pump engine rotor portion. The permanent magnet and the pump rotor portion may also be integrated using injection molding techniques, whereby the permanent magnet is a so called plastic bonded permanent magnet. Within the scope of the invention, it would also be possible to form the permanent magnet and pump engine rotor portion of the same material, such material having magnetic properties whereby the magnetisation of the permanent magnet portion may be performed after manufacturing of the rotor part.

The permanent magnet may have other magnetisation configurations, for example the disc shaped or annular shaped permanent magnet may have a diametral polarization (in effect a single N-S polarity configuration) or may have an axial N-S polarization in which case the rotor would further comprise a magnetic circuit made of a soft magnetic material (i.e. a magnetic material with high magnetic permeability) having teeth or teeth like protuberances constituting magnetic poles distributed around the circumference of the rotor and projecting radially outwards. Various known electrical motor drive designs with permanent magnets may be implemented in the present invention.

In the embodiment illustrated, the stator 4 comprises one or more electromagnets or coils 18, and a magnetic circuit 10 having one or more magnetic cores 12 formed of a material with high magnetic permeability for instance of a stack of soft iron sheets per se well-known in electrical motor design. Alternatively the stator is formed of a so called soft magnetic material) this allows for a advantageous 3D optimized stator design, allowing optimized performance and/or space adaptations. The magnetic circuit advantageously comprises a plurality of branches 14a, 14b defining teeth 16a, 16b at their extremities spaced from the rotor by a small air gap, the magnetic circuit directing the flow of magnetic flux from the one or more coils 18 of the stator. The coils may be mounted on a branch of the magnetic circuit. Various configurations of electro-magnet coils and magnetic circuits for generating a changing magnetic field acting on the rotor 6 to generate torque on the rotor may be implemented in this invention as per se known in electrical motor drive technology.

In the embodiment illustrated, the stator magnetic circuit and rotor form a synchronous motor, for instance an open-loop/stepper or closed-loop/brushless DC motor. The multi-segment permanent magnet of the rotor may also advantageously be used for accurate angular and axial position sensing of the rotor as will be described in more detail herebelow.

Figure 8:
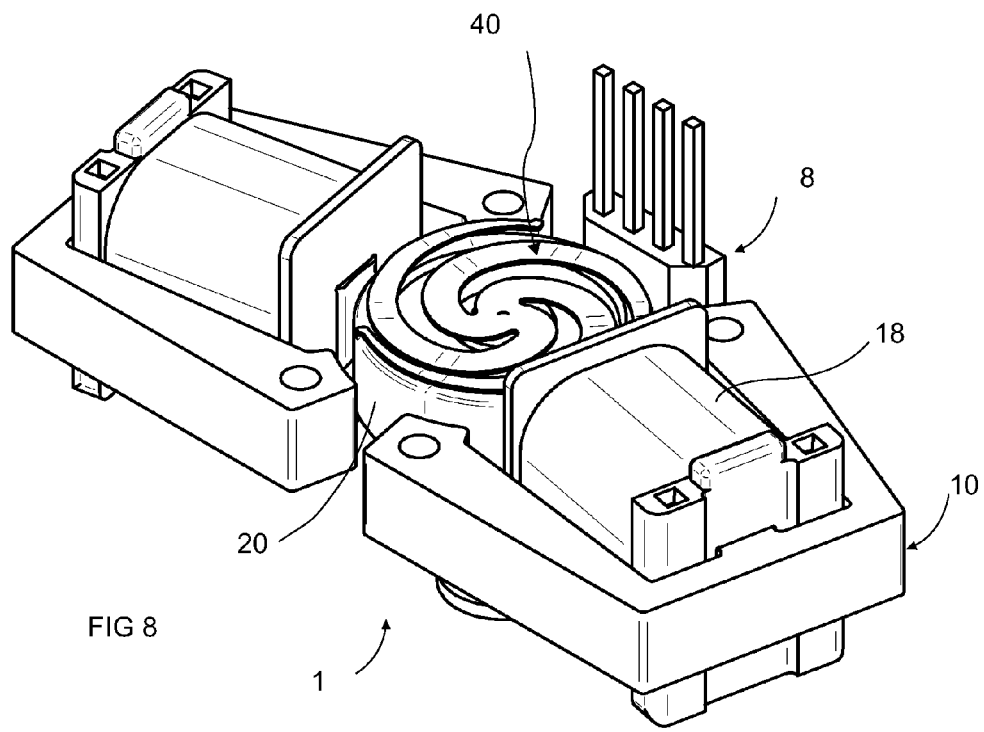
FIG. 8 is a perspective view of a portion of a pump according to another embodiment of this invention.

The stator 4 may advantageously further comprise a circuit board 11 on which the magnetic circuit, and in particular the coils 18 thereof are directly mounted, also enabling electrical connection of the coils to the circuit board and of the magnetic cores to the circuit board. In this advantageous configuration, an axial end face 36 of the rotor faces and is opposite a surface of the circuit board, separated therefrom by a gap (d) allowing axial displacement of the rotor 6, taking into account the disposition of the position sensor 8 on the circuit board. As shown in FIGS. 1a to 1c the position sensor 8 may thus advantageously be mounted directly on the circuit board and connected to the measurement signal processing circuit thereon, the position sensors 24a, 24b being advantageously positioned proximate and opposite the outer axial face 36 of the rotor which in the embodiment shown is formed by the permanent magnet 20. The position sensor 8 may also be mounted laterally of the rotor rather than facing an axial end, as illustrated in FIG. 8.

The position sensor may advantageously comprise a pair of magnetic field detectors 24a, 24b positioned at a certain radial distance from the axis of rotation A of the rotor, whereby the pair of detectors may be separated from each other by a certain angular distance α. The angle α between the centers of the magnetic field detectors is preferably such that the electrical phase offset is 90°, or in other words such that when one magnetic field sensor faces a magnetic field maximum, the other sensor faces a magnetic field zero point. For instance, in FIG. 2a, comprising 4 pairs of N-S poles, the smallest optimum geometrical angular offset between both magnetic field detectors is 22.5°, so angle α can be an integer multiple of the pole geometrical angular width, e.g. 45°. The magnetic field detectors may advantageously be Hall effect sensors although within the scope of the invention it will be possible to use other types of magnetic field detectors, such as giant magneto resistive detectors and fluxgate detectors. It is possible to have more than two magnetic field detectors, for example three or four magnetic field detectors, for instance to provide a supplementary control signal that may be redundant but used for safety to control correct functioning of the position sensor.

A pair of Hall effect sensors in the form of a pair of Application Specific Integrated Circuits (ASICs) 24a, 24b is illustrated in the figures, such Hall effect sensors being widely available in this form. It is also possible to have a single ASIC integrating therein two or more Hall effect circuits or chips to produce two or more position sensing signals in order to determine rotor angle displacement and axial displacement. Within the scope of this invention, the meaning of a pair of magnetic field detectors thus includes a single electronic component that incorporates at least a pair of magnetic field detector circuit elements. The two Hall circuit elements could be positioned adjacent each other (i.e. they do not necessarily need to be spaced apart) in an essentially orthogonal configuration parallel to the rotor axis A such that the magnetic field signal picked up by the two Hall circuits are phase shifted by 90°, whereby the rotor for example could have a single N-S diametral magnetisation.

In the invention, a pair of magnetic field detectors may advantageously be implemented to detect both angular position of the rotor as well axial (stroke) position, however it is possible to have a pair or more of magnetic field detectors for determining angular position and one or more further magnetic field detectors to detect axial position of the rotor.

Figure 5:
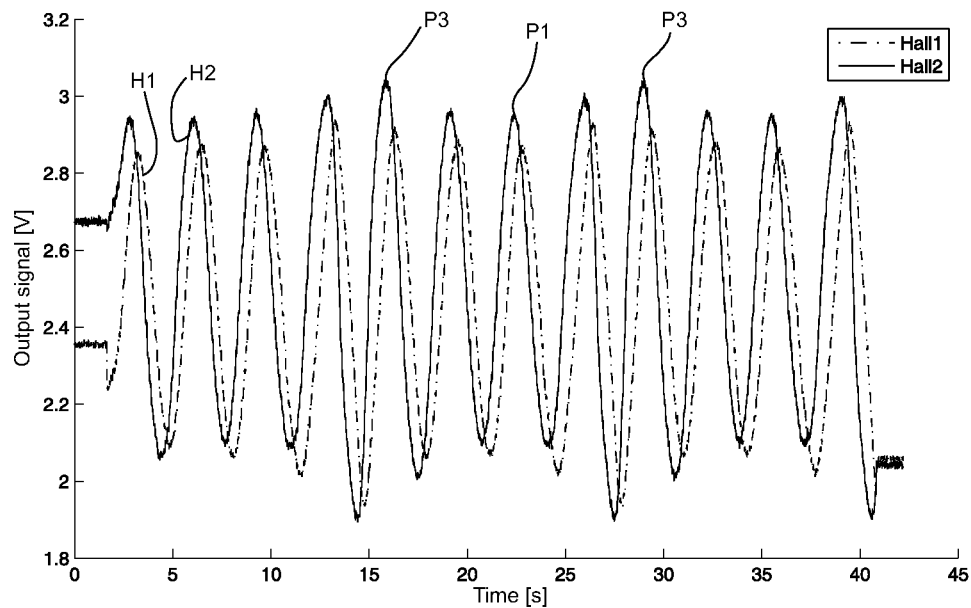
FIG. 5 is a graph illustrating the output signal in volts as a function of time of a pair of magnetic filed detectors of a position sensor of the pump according to an embodiment.

Referring now to FIG. 5, each magnetic field detector, generates a signal H1, H2 (indicated as a voltage in the graph of FIG. 5) that is essentially proportional to the magnitude of the magnetic field acting on the magnetic field detector. As the magnetic segments of alternating polarity N-S of the permanent magnet rotate past the magnetic field detector, an approximately sinusoidal signal is generated as shown. The amplitude of the signal (i.e. the distance between the upper and lower peaks of the signal) is affected by the magnet strength and the axial position of the rotor permanent magnet relative to the magnetic field detectors, since the intensity of the magnetic field increases as the rotor approaches the magnetic field detectors. As best seen in FIG. 5, the sinusoidal signal of greatest amplitude at points P3 indicates that the rotor at these angular positions is closest to the magnetic field detector, and the signal of lowest amplitude at points P1 indicates the most distant position of the rotor from the magnetic field detectors. The two output signals H1, H2 of the first and second magnetic field detectors respectively, are phase shifted by an amount correlated to the angular separation α of the magnetic field detectors and the angle β between segments N,S of the rotor permanent magnet. In the example of FIG. 1, the permanent magnet comprises four N-S magnetic pole pairs, therefore four periods of the electric signal from the magnetic field detectors correspond to one mechanical revolution of the rotor.

The axial position of the rotor may thus be determined by the amplitude of the signal of the magnetic field detectors whereas the angular position of the rotor may be determined by the arctangent of the signal of one magnetic field detector divided by the signal of the other magnetic field detector (arctan H1/H2).

Figure 6:
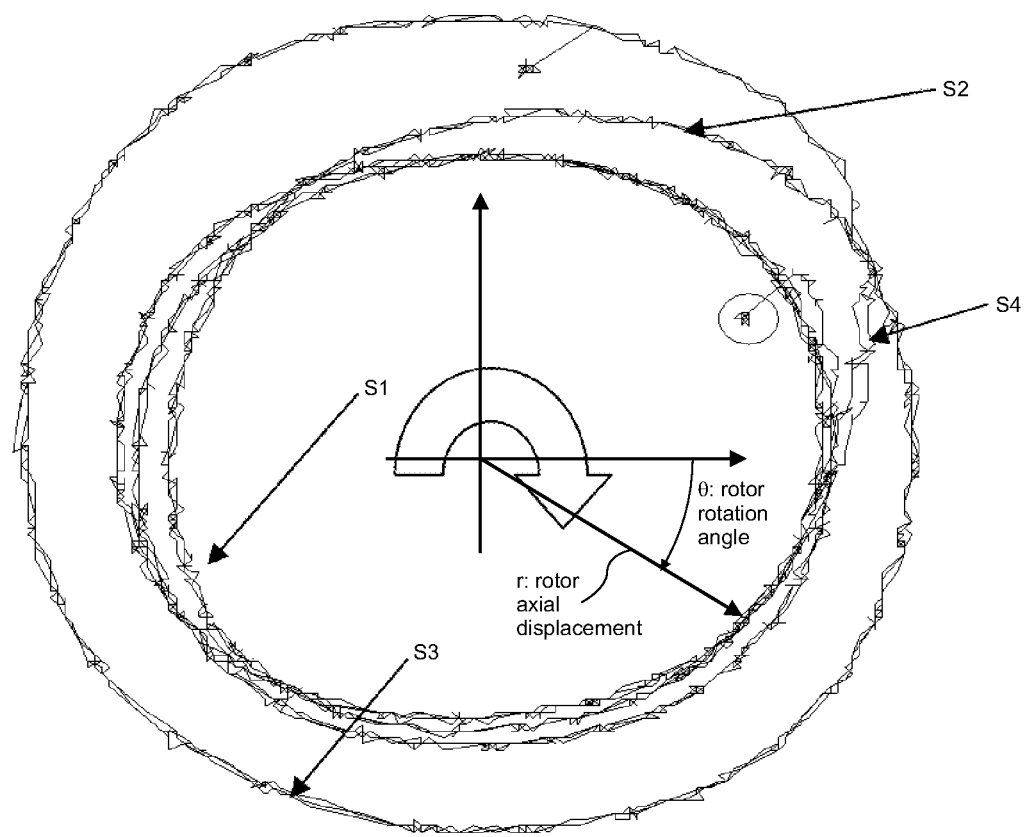
FIG. 6 is a graph in polar coordinates of the output of the magnetic field detectors according to an embodiment.

The output signals of the pair of magnetic field detectors may also be illustrated in polar coordinates as shown in FIG. 6 whereby the radial position (r) of the curve corresponds to the magnetic flux density at the sensor and thus to the axial (stroke) position of the pump rotor.

The axial displacement of the rotor depends on the profile of the cam and the opened and closed positions of the pump inlet and outlet valves V1, V2 as best illustrated in FIG. 3a where the profile of displacement of the rotor is in the present embodiment split into six sections S1, S2, S3a, S3b, S4 and S5. In section S1, the distance of the rotor from the position sensors is the most distant and no axial displacement takes place (i.e. the pump is neither filling nor emptying). Just before or as the cam protrusion on the stator meets the ramp CP2 of the rotor cam profile, the pump inlet valve V1 opens and the rotor is axially displaced towards the position sensors up the inlet/suction section S2 up to the maximum axial displacement position defined by the cam portion CP3 after which the inlet valve closes and the rotor follows the flat path of section S3a along the cam portion CP3 until the cam finger on the stator goes past the cam profile section CP4. Along section S3b after the cam dropdown CP4, there is essentially no axial displacement since the liquid therein is essentially incompressible. There is however an inherent elasticity in the materials surrounding and containing the liquid in the pump, in particular in the seals which are elastic, such that there is a slight axial displacement step S3b as illustrated. Even though the cam profile abruptly changes at CP4 to the minimum value CP5 the rotor axial position does not change (except for the slight step explained above) until the outlet valve opens allowing liquid to be expelled from the pump chamber.

As the pump engine chamber empties, the axial displacement of the rotor follows the section S4 down to the minimum value defined by the cam profile CP5 to follow section S5 (which then rejoins S1 for further cycles). It should be noted that in order to keep the cam elements of the rotor and stator engaged, an axial biasing force is applied on the rotor relative to the stator. In typical embodiments, the axial biasing force may be applied magnetically and/or by means of a preloaded spring 40 as shown in FIG. 8.

In the case of a leakage in the pump chamber, for example due to a defective seal, the rotor displacement may be detected since the rotor will displace axially in the zone Z1 before the outlet valve is opened and the ramp S4' as illustrated in FIG. 3b and FIG. 9a may be detected.

Leakage in the pump chamber may also be detected by effecting a back and forth displacement of the rotor after the ramp dropdown section CP4 in the section (zone Z1) where both valves V1 and V2 are closed as illustrated in FIG. 3f. The back and forth rotation of the rotor (also named herein "wobbling") while an axial force is applied to the rotor, over an angle of less than 180°, for instance between 20° to 60°, for instance 30° to 40°, causes the rotor shaft to perform an axial displacement S4'''' in a leakage condition of greater overall amplitude in the section where the valves are closed, compared to a configuration without wobbling (shown in FIG. 3b). Any leakage in the pump chamber can thus be easily and reliably detected. The wobbling operation may be performed at the beginning, end of an operation of the pump or even at every cycle of the rotor, depending on the pumping application. The wobbling operation is similar to a unidirectional rotational movement over a large angle (e.g. greater than 180°) to detect small amounts of leakage and a corresponding small axial displacement (e.g., less than $1/10^{th}$ of the total stroke). It can however be performed over a smaller angular region where both valves are closed and thus leave more angular space for the other functions, e.g. when open valves are required for intake or expel operations.

In a variant of the invention where the cam ramp dropdown (CP4 to CP5) is essentially simultaneous with the valve V2 opening, occlusion detection is possible, however leakage detection is limited.

A back and forth rotation of the rotor while an axial force is applied to the rotor may also be effected to dislodge gas bubbles in the pump chamber, especially during the priming operation. Preferably, the wobbling is performed at a position where the cam finger is over the ramp section CP2, such that the rotor performs a rotational and axial back and forth movement to dislodge bubbles stuck to the pump chamber walls. In a variant, gas bubbles may be dislodged by rotating the rotor in a reverse direction until the cam finger hits the stop CP4 to create a mechanical shock (deceleration). A back and forth rotation may be effected two or more times with the stator cam hitting the stop CP4 at each reverse rotation to create a plurality of successive shocks to dislodge gas bubbles. The rotor may then effect pumping cycles to evacuate the gas bubbles after the wobbling operation.

The bubble dislodging operation may be effected in the priming operation, but may also be effected at any time during the operation of the pump, at regular intervals or for example after a malfunction detection, in particular to distinguish between a malfunction due to leakage or the presence of gas in the pump. In effect, a rotor displacement according to FIG. 3b, 10b, 10c, or 3f could represent gas in the pump chamber instead of leakage. In order to distinguish between these conditions, after detection of a presumed leakage malfunction, a bubble dislodging and evacuation operation is effected as described above, and thereafter a further leakage detection operation is effected. If the initial malfunction alarm was due to the presence of bubbles, then the bubbles will be evacuated during the bubble dislodging operation and the subsequent leakage detection test will signal normal operation. If the initial alarm was not due to the presence of gas in the pump, then the subsequent test will confirm the leakage malfunction.

As illustrated in FIG. 3c or 9a, if there is unusually low pressure downstream of the pump, for example because of a disconnected or leaking pipe downstream of the outlet (e.g. a disconnected catheter) the rotor will displace axially quicker towards the low position, and thus generate a steeper exhaust ramp S4'' in zone Z2 when the outlet valve V2 is open. The reliable detection of leakage downstream of the pump will however depend on the ratio of pressure downstream of the pump under regular conditions and the pressure drop due to a leak downstream of the pump. The higher the pressure drop, the easier it will be to detect the leakage reliably. In applications where pumping occurs against a large relative pressure the leakage detection function downstream is thus particularly advantageous.

In the case of partial occlusion, for example in the case of impurities, a pinched outlet pipe, a blood clot and the like, the downstream pressure at the outlet will increase and cause the axial displacement S4''' of the rotor to be more gradual as illustrated in FIG. 3d or 9c as the axial biasing force will need to act against the backpressure. In the case of complete occlusion the pump rotor displacement S4'''', S5'''' may not reach the minimum position in zones Z3 when the outlet valve V2 is open, or by the time the outlet valve V2 closes again in zone Z4 as illustrated in FIG. 3e or 9d.

Referring once again to FIG. 6, the rotor axial displacement as a function of angular displacement illustrates the filling/suction section S2, maximum axial position S3a, S3b, exhaust or expelling ramp S4 and minimum axial position S1.

Each of the displacement profiles may be compared to an expected or defined reference profile as shown in FIG. 3a that may be stored in a table of the measurement signal processing circuit of the pump. The reference profile may be for instance the cam profile CP1-CP2-CP3-CP4-CP5.

EXAMPLE

An example of practical implementation of an algorithm to detect malfunction is described below.

A set of three curves may be recorded as follows:
1. rotation of the rotor backward to the stop position and subsequently in the forward direction; at specified angles (e.g. after each step of a stepping motor or each commutation step of an brushless DC motor) the stroke is recorded and yields a calibration curve CAL (e.g. 1×24 register)
2. at the end of the pump priming phase, at specified angles (e.g. after each step of a stepping motor resp. after each commutation step of a brushless DC motor) a measurement is done and yields a reference curve REF (e.g. 1×24 register)
3. during the pumping process, at specified angles (e.g. after each step of a stepping motor or commutation step of a brushless DC motor) a measurement is performed and yields an actual curve ACT (e.g. 1×24 register)

The detection of various conditions may be detected by comparing the actual curve ACT with the reference curve REF in the various zones Z1, Z2, Z3 and Z4 after the cam ramp dropdown section CP4

Figure 4:
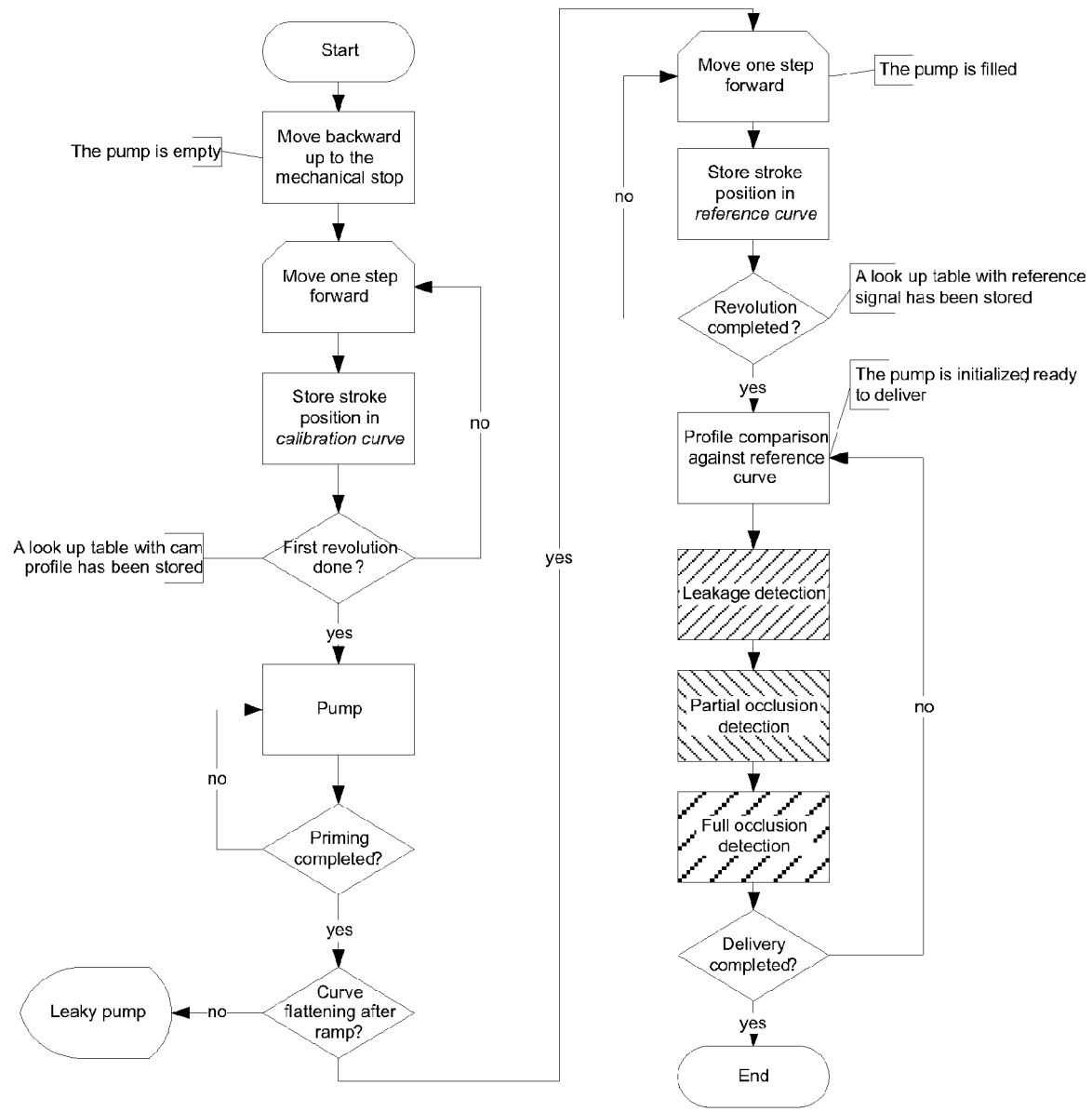
FIG. 4 is a flow chart illustrating steps of measuring the displacement profile of a rotor according to an embodiment of this invention.
Figure 7:
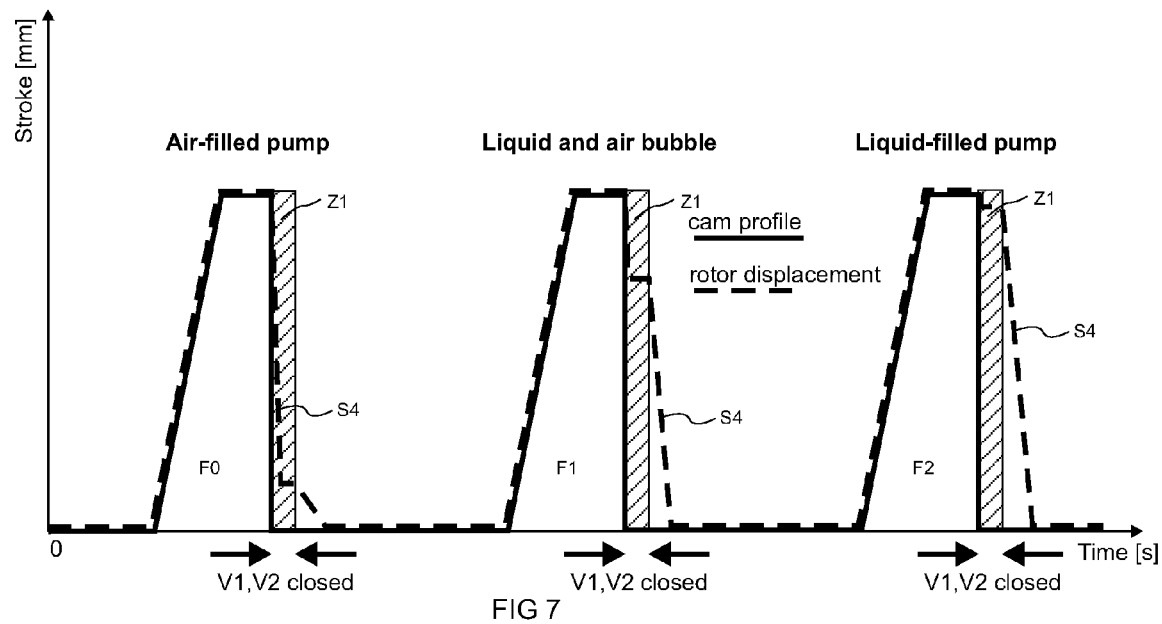
FIG. 7 is a graph illustrating the axial displacement (stroke) of the pump rotor as a function of the angular displacement of the rotor during priming of a pump according to this invention.

Normal condition: ACT(Z1)−REF(Z1)<threshold value & ACT(z3)−REF(z3)=0→OK, no distal pressure Leakage: ACT(Z1)−REF(Z1)<0→Leakage Leakage downstream: ACT(Z2)−REF(Z2)<0→Leakage downstream Partial occlusion: ACT(Z3)−REF(Z3)>0→the system is partially occluded at the output Complete occlusion: ACT(Z4)−REF(Z4)>0→complete occlusion at the output Wobbling: usually prior to a bolus delivery
ACT(Z1) within a given interval→pump is tight to microleaks
ACT(Z1)−REF(Z1)<0→microleak or macroleak
Cam profile abrasion: reduction of expelled volume StrokeRef=CAL(CP3)−CAL(CP1) is the reference stroke StrokeAct=ACT(CP3)−ACT(CP1) is the actual stroke StrokeAct−StrokeRef<0→abrasion of the ramp
Dirt on the cam profile: increase of expelled volume
StrokeAct−StrokeRef>0→some dirt is on the ramp→malfunction
Bubbles in the pump chamber: the signature is similar to leakage, however the signal is temporary. A counter is incremented for each pump cycle with ACT(z1)−REF(z1)<0. If counter>max_allowed_counts→leakage, otherwise leakage and/or bubbles
At regular intervals, record a new reference curve REF2.
If REF2−REF≠0: change in the pump configuration
REF2−REF has a sine component→the stator lies oblique to the rotor Referring in particular to FIG. 4, the steps of a measurement cycle according to an embodiment is illustrated. At the beginning of the cycle, the rotor is driven in a reverse direction until the shoulder CP4 (mechanical stop) abuts the complementary cam finger, thus setting a defined starting position. The pump rotor may then be turned in the forward (pumping) direction at least one revolution whereby the stroke (axial displacement) of the rotor is stored as a function of the angular displacement. In this embodiment, the recorded signal includes the intake or suction part of the signal, however the outlet or exhaust part of the signal is not included due to the initial backward movement up to the stop CP4 and essentially corresponds to the geometrical profile of the cam. This initial measurement may be stored in a look-up table to determine the reference profile of the rotor displacement so that the cam profile is calibrated. The initial measurement may be advantageously performed when the pump is initially put into service and is not primed yet. After the calibration cam profile setting, the pump may then be filled (primed) and ready to pump liquid and from then on the monitoring of pump malfunctioning (measurement of occlusion and leakage) can be performed. It is possible however to record a reference profile after the pump has been primed. As illustrated in FIG. 7, during the priming operation, the rotor shaft displacement profile S4 after the cam dropdown CP4 (over the section where the valves V1, V2 are closed) initially drops (curve F0) in zone Z1 because the pump chamber is filled with air which is a compressible medium. As the pump chamber fills with liquid (curve F1), the rotor shaft drop is less pronounced since there is less air to be compressed in the pump chamber. When the pump chamber is fully primed (curve F2) and air bubbles are removed, the rotor displacement follows a normal condition profile. The priming operation can thus be monitored to ensure correct functioning of the pump and the absence of air bubbles in the pump chamber. After priming has been successfully completed, the rotor displacement normal condition may be recorded and stored in a reference curve. The last recorded curve may then be compared against the reference curve to detect malfunctions (e.g., leakage or occlusion).

The rotor displacement profile can be measured continuously and compared at every cycle or at regular intervals after a certain number of cycles and compared with the expected pre-defined normal condition profile in the look-up table. Deviations from the normal profile as illustrated in FIGS. 3b to 3f may thus be detected by the comparison, indicating not only that there is mal-functioning but also the nature of the mal-functioning.

A preferred and advantageous embodiment of the pump according to this invention requires only two magnetic field detectors or detector circuit elements that produce an output signal that is robust and easy to process, while providing an accurate, reliable and safe rotor stroke and angular displacement measurement to determine malfunction and the nature of any malfunction. In the afore-mentioned embodiment, the rotor and stator design is particularly simple, compact and economical to manufacture and operate. Signal processing requirements are also economical.

In a variant of the invention, a plurality of calibration/reference curves can be recorded to improve the robustness of the safety algorithms:

Production reference curves may be recorded on statistically representative units as part of the manufacturing process. These reference curves advantageously allow to evaluate the manufacturing tolerances and detect coarse deviations.

Reference curve before priming: This reference curve defines the shape of the stroke curve when the pump is filled with air, e.g., during passage of an air bubble. It could for instance be used to discriminate between an air bubble and a leakage condition. A second way to discriminate leakage and air bubbles is to perform a wobbling in zone Z1. If the stroke signal stabilizes at a certain height, it signals the presence of air. If the stroke signal decreases down to the base line CP5, it signals leakage because the pump chamber is fully emptied.

Reference curve after priming: Whenever the curve in zone Z1 stabilizes to a certain level, it can be assumed that the system is fully primed (i.e., air-free). Also, the comparison to an "expected" factory value can help perform a plausibility check whether the system is really air-free.

The calibration curve may be used to calibrate the signal of the hall sensors. It can be re-recorded at regular intervals to compensate for signal drift (e.g., thermal). Alternatively, it can be used to detect wear, e.g., of the cam.

A reference curve prior to connection of the pump to a patient's skin shows a system in a theoretically occlusion-free condition.

The invention claimed is:

1. A pump comprising an electrical motor drive (2) and a pump engine (3), the pump engine having a stator portion (32) and an axially and rotatably movable rotor portion (30) mounted in the stator portion and having an inlet and an outlet, the electrical motor drive comprising a rotor (6) with a permanent magnet (20), a stator (4) with a magnetic circuit (10) and one or more coils (18), and a position sensor (8) comprising at least a pair of magnetic field detectors (24a, 24b) positioned in the proximity of the rotor permanent magnet opposite an axial end (36) of the rotor permanent magnet and configured such that the signal phase offset between the pair of magnetic field detectors is 90° to detect both rotational and axial movement of the rotor.

2. The pump according to claim 1, wherein the magnetic field detectors are Hall effect detectors.

3. The pump according to claim 1, wherein the stator comprises a circuit board (11) and the coils (18) and magnetic field detectors (24a, 24b) are mounted on the circuit board.

4. The pump according to claim 1, wherein the rotor permanent magnet comprises alternating polarity (N-S) segments disposed around the circumference of the rotor.

5. The pump according to claim 4, wherein the stator magnetic circuit and rotor form a stepping motor.

6. The pump according to claim 1, wherein the pair of magnetic field detectors (24a, 24b) are positioned at a certain radial distance from the axis of rotation A of the rotor and separated from each other by a certain angular distance α configured to obtain said signal phase offset of 90° between the magnetic field detectors.

7. The pump according to claim 1, wherein the stator magnetic circuit, the position sensors and rotor form a brushless DC motor.

8. The pump according to claim 1, wherein the axial movement is detected by a separate sensor, being radially located in the proximity of the rotors axial endface and detecting the magnetic field from a separate unipolar magnetized permanent magnet, being in contact with the rotor.

9. The pump according to claim 1, wherein the axial movement is detected by a separate sensor, being radially located in the proximity of the rotors axial end face and detecting the magnetic field from an integral section of the rotor magnet.

10. A method of detecting occlusion or leakage of a pump comprising a position sensor, said method comprising performing an initial measurement comprising turning the rotor in a forward pumping direction at least one revolution and storing an axial displacement as a function of a rotation displacement profile in a look-up table as a stored cam profile, measuring the axial displacement as a function of the rotation displacement during subsequent pumping and comparing the measured axial displacement with the stored cam profile, wherein the pump comprises an electrical motor drive (2) and a pump engine (3), the pump engine having a stator portion (32) and an axially and rotatably movable rotor portion (30) mounted in the stator portion and having an inlet and an outlet, the electrical motor drive comprising a rotor (6) with a permanent magnet (20), a stator (4) with a magnetic circuit (10) and one or more coils (18), and a position sensor (8) comprising at least a pair of magnetic field detectors (24a, 24b) positioned in the proximity of the rotor permanent magnet opposite an axial end (36) of the rotor permanent magnet and configured such that the signal phase offset between the pair of magnetic field detectors is 90° to detect both rotational and axial movement of the rotor.

11. The method according to claim 10, wherein before performing the initial measurement, the rotor is rotated in a reverse direction until a cam shoulder (CP4) abuts a complementary cam finger, thus setting a defined reference starting position.

12. The method according to claim 10, wherein the position sensor comprises a pair of magnetic field detectors and the axial position of the rotor is determined by the amplitude of the signal of the pair of magnetic field detectors and the angular position of the rotor is determined by an arctangent of a signal of one of said pair of magnetic field detectors divided by a signal of the other of said pair of magnetic field detectors.

13. The method according to claim 10, wherein a back and forth displacement of the rotor is effected over an angle less than 90° when both the inlet valve and the outlet valve (V1, V2) are closed to detect leakage.

14. A method of removing gas bubbles or detecting leakage in a pump comprising an electrical motor drive (2) and a pump engine (3), the pump engine comprising a stator portion (32) and an axially and rotatably movable rotor portion (30) mounted in the stator portion and having an inlet valve (V1) and an outlet valve (v2), the method including applying a back and forth displacement of the rotor over an angle less than 180° while applying an axial force on the rotor, wherein the pump comprises an electrical motor drive (2) and a pump engine (3), the pump engine having a stator portion (32) and an axially and rotatably movable rotor portion (30) mounted in the stator portion and having an inlet and an outlet, the electrical motor drive comprising a rotor (6) with a permanent magnet (20), a stator (4) with a magnetic circuit (10) and one or more coils (18), and a position sensor (8) comprising at least a pair of magnetic field detectors (24a, 24b) positioned in the proximity of the rotor permanent magnet opposite an axial end (36) of the rotor permanent magnet and configured such that the signal phase offset between the pair of magnetic field detectors is 90° to detect both rotational and axial movement of the rotor.

15. The method according to claim 14, wherein the back and forth displacement of the rotor occurs when both the inlet valve and the outlet valve (V1, V2) are closed over an angle less than 90°.

* * * * *